United States Patent [19]

Maekawa

[11] Patent Number: 4,969,103
[45] Date of Patent: Nov. 6, 1990

[54] SPEED CONTROL APPARATUS FOR AN AUTOMOTIVE VEHICLE WITH CREEP CONTROL

[75] Inventor: Hiroko Maekawa, Himeji, Japan

[73] Assignee: Mitsubishi Denki Kabushiki Kaisha, Tokyo, Japan

[21] Appl. No.: 430,036

[22] Filed: Nov. 1, 1989

[30] Foreign Application Priority Data

Nov. 9, 1988 [JP] Japan .................. 63-284413
Nov. 9, 1988 [JP] Japan .................. 63-284414
Nov. 9, 1988 [JP] Japan .................. 63-284415
Nov. 9, 1988 [JP] Japan .................. 63-284416

[51] Int. Cl.$^5$ ............................ B60K 31/00
[52] U.S. Cl. .................... 364/426.04; 364/426.01; 180/179
[58] Field of Search .......... 364/426.04, 426.01; 123/351-352, 357-359; 180/177-179

[56] References Cited

U.S. PATENT DOCUMENTS

| | | | |
|---|---|---|---|
| 3,952,236 | 4/1976 | Hoover | 318/139 |
| 4,553,448 | 11/1985 | Youngers et al. | 74/479 |
| 4,670,845 | 6/1987 | Etoh | 364/426.04 |
| 4,709,335 | 11/1987 | Okamoto | 364/426.04 |
| 4,714,864 | 11/1987 | Yogo et al. | 318/52 |
| 4,830,156 | 5/1989 | Bellah et al. | 74/475 |
| 4,850,250 | 7/1989 | Nehmer et al. | 74/857 |

FOREIGN PATENT DOCUMENTS 247525 11/1986 Japan .
255252 11/1987 Japan .

Primary Examiner—Parshotam S. Lall
Assistant Examiner—Tyrone Queen
Attorney, Agent, or Firm—Sughrue, Mion, Zinn, Macpeak & Seas

[57] ABSTRACT

A speed control apparatus for an automotive vehicle performs creep control and suppresses wheel slipping. At low vehicle speeds, a control unit calculates a target vehicle speed based on the amount of depression of the accelerator pedal and controls a throttle actuator to maintain the target speed. The driver can change the target speed by adjusting the amount of accelerator pedal depression. The brakes of the vehicle are automatically applied when the accelerator pedal is released. A vehicle separation sensor measures the separation from a preceding vehicle. When the vehicle separation falls below a prescribed level, the control unit automatically applies the brakes of the vehicle. The control unit detects wheel slip by monitoring the speed difference between the front and rear wheels. When wheel slip occurs, the control unit decreases the throttle valve opening and applied the brakes until wheel slip is suppressed.

8 Claims, 3 Drawing Sheets

SPEED CONTROL APPARATUS FOR AN AUTOMOTIVE VEHICLE WITH CREEP CONTROL

BACKGROUND OF THE INVENTION

This invention relates to a speed control apparatus for an automotive vehicle. More particularly, it relates to a speed control apparatus which can perform creep control at low vehicle speeds.

Cruise control devices which maintain the speed of a vehicle constant at high speeds have existed for many years. Recently, creep control devices for use at low vehicle speeds have been proposed. A creep control device is a device which maintains the speed of a vehicle constant when the vehicle is running at low speeds. Creep control is especially advantageous when travelling in congested traffic for long periods of time, when parking a vehicle in a garage, or when passing another vehicle along a narrow road. For example, Japanese Published Unexamined Patent Application No. 61-247525 discloses a creep control device in which a control unit adjusts the degree of opening of a throttle valve so as to maintain a constant, predetermined vehicle speed as long as the accelerator pedal is depressed. When the control unit is performing creep control, the vehicle speed is independent of the amount of depression of the accelerator pedal. When the driver removes his foot from the accelerator pedal, the control unit automatically applies the brakes and stops the vehicle. However, that apparatus has the disadvantage that the driver can not freely control the creep speed (the vehicle speed during creep control), which is set in advance.

Japanese Published Unexamined Patent Application No. 62-2155252 discloses a creep control apparatus in which the throttle valve and the brakes of a vehicle are both controlled by a control unit so as to maintain a predetermined creep speed. Creep control is performed only when the driver is not depressing either the accelerator pedal or the brake pedal. That apparatus likewise has the disadvantage that the creep speed is set in advance and can not be easily adjusted by the driver.

SUMMARY OF THE INVENTION

It is an object of the present invention to provide a speed control apparatus for an automotive vehicle which can perform creep control while enabling the driver of the vehicle to freely adjust the creep speed.

It is another object of the present invention to provide a speed control apparatus which can automatically maintain a safe separation between the vehicle and a preceding vehicle, thereby preventing collisions with the preceding vehicle.

It is yet another object of the present invention to provide a speed control apparatus which can automatically stop the vehicle when an obstacle is detected in front of the vehicle.

It is still another object of the present invention to provide a speed control apparatus which can automatically suppress wheel slipping.

A speed control apparatus according to the present invention is equipped with a throttle actuator for opening and closing the throttle valve of the vehicle, a brake controller for controlling the brakes of the vehicle, an accelerator depression sensor for sensing the amount of depression of the accelerator pedal of the vehicle, a vehicle speed sensor for sensing the speed of the vehicle, and a vehicle separation sensor for sensing the separation of the vehicle from a preceding vehicle. The speed of the vehicle is controlled by a controller which is responsive to the accelerator depression sensor, the vehicle speed sensor, and the vehicle separation sensor. The controller includes mode selecting means for selecting a driving mode and creep control means for performing creep control when the selecting means selects creep control mode. In preferred embodiments, the controller is constituted by a microcomputer.

When the mode selecting means of the controller selects the creep control mode, the creep control means determines a target vehicle speed based on the depression of the accelerator pedal, and it controls the throttle actuator to maintain the vehicle speed equal to the target speed during the creep control mode. The creep control means also automatically controls a brake actuator to apply the brakes of the vehicle when the vehicle separation falls below a prescribed minimum separation.

The present invention is particularly suited for application to automobiles in which the brakes and the throttle valve are not mechanically connected to the brake pedal or the throttle valve, respectively. In this type of automobile, the depression of the brake pedal or accelerator pedal is sensed by electrical sensors, and actuators for the brakes and the throttle valve are remotely controlled based on the electrical output signals from the sensors. An automobile of this type is described in Isuzu Technical Reports No. 72, pages 7-20.

DESCRIPTION OF THE PREFERRED EMBODIMENTS

Figure 1:
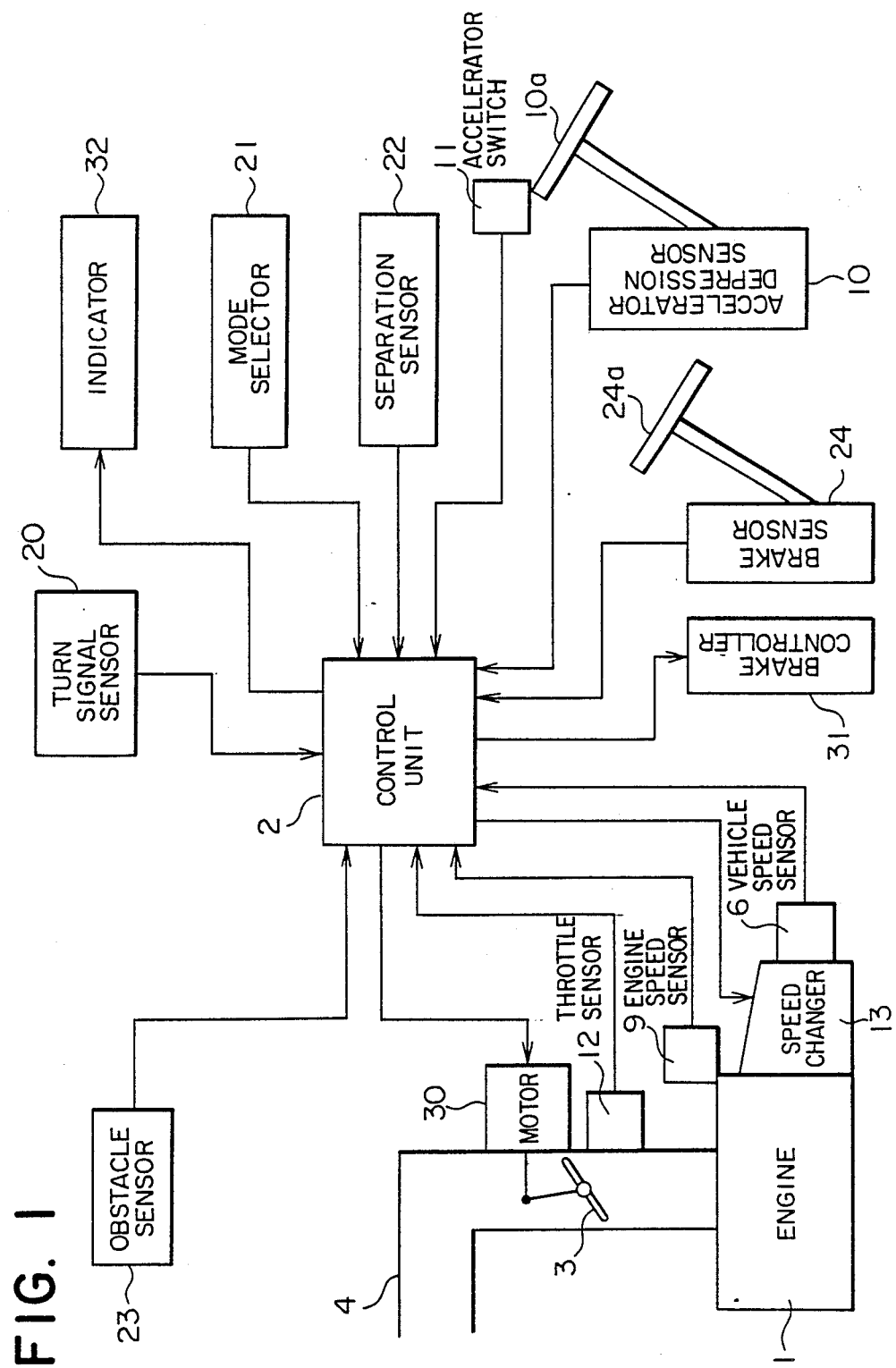
FIG. 1 is a block diagram of a first embodiment of a speed control apparatus according to the present invention.

A number of preferred embodiments of a speed control apparatus will now be described while referring to the accompanying drawings. FIG. 1 is a block diagram of a first embodiment. As shown in this figure, the engine 1 of an unillustrated automotive vehicle is equipped with an air intake pipe 4 in which a throttle valve 3 is pivotally mounted. The throttle valve 3 can be opened and closed by a throttle actuator 30 which includes an electric motor. The operation of the throttle actuator 30 is controlled by a control unit 2 in the form of a microcomputer. An automatic speed changer 13 such as a torque converter transmission for the engine 1 is controlled by the control unit 2. A vehicle speed sensor 6 generates an output signal indicating the speed of the vehicle. An engine speed sensor 9 generates an output signal indicating the rotational speed of the engine 1. A throttle opening sensor 12 generates an output signal indicating the degree of opening of the throttle valve 3. The output signals from the vehicle speed sensor 6, the engine speed sensor 9, and the throttle opening sensor 12 are provided to the control unit 2.

The accelerator pedal 10a of the vehicle is equipped with an accelerator pedal depression sensor 10 and an accelerator switch 11. The accelerator pedal depression sensor 10 generates an output signal indicating the amount of depression of the accelerator pedal 10a, while the accelerator switch 11 generates an output signal which indicates whether or not the accelerator pedal 10a is depressed. The output signals from the accelerator pedal depression sensor 10 and the accelerator switch 11 are input to the control unit 2.

Similarly, the brake pedal 24a of the vehicle is equipped with a brake sensor 24 which provides the control unit 2 with a signal indicating the amount of depression of the brake pedal 24a. Based on the output signal from the brake sensor 24 and other signals, the control unit 2 provides a control signal to a brake controller 31, which controls the operation of the unillustrated brakes of the vehicle.

A turn signal sensor 20 generates an output signal indicating whether or not the turn signal of the vehicle is turned on. A mode selector 21 enables the driver of the vehicle to manually select a normal driving mode or a creep control mode. The mode selector 21 generates an output signal indicating the mode which was selected by the driver. The mode selector 21 can be, for example, a button which the driver presses when he wishes to start or cancel creep control. A vehicle separation sensor 22 measures the separation between the vehicle whose speed is being controlled (referred to as the "present vehicle") and another vehicle (referred to as the "preceding vehicle") which is traveling in front of the present vehicle. It generates an output signal indicating the magnitude of the vehicle separation. An obstacle sensor 23 senses when there is an obstacle within a prescribed distance in front of the vehicle and generates a corresponding output signal. The output signals from the turn signal sensor 20, the mode selector 21, the vehicle separation sensor 22, and the obstacle sensor 23 are input to the control unit 2.

An indicator 32 such as a buzzer or an LED is controlled by the control unit 2 to indicate to the driver the present driving mode and alert the driver to changes in driving mode or to dangerous situations.

The control unit 2 functions as a mode selecting means for selecting the appropriate mode of vehicle operation based on the input signals from the various sensors. In this embodiment, the mode selecting means selects either a creep control mode or a normal driving mode. The control unit 2 also functions as a creep control means for controlling the engine 1 during the creep control mode, and as a normal driving control means for controlling the engine during the normal driving mode.

If the driver of the vehicle has set the mode selector 21 for the normal driving mode, the control unit 2 automatically selects the normal driving mode. In this mode, the control unit 2 controls the opening of the throttle valve 3 using the actuator 30 on the basis of the amount of depression of the accelerator pedal 10a, as indicated by the accelerator pedal depression sensor 10. When the driver steps on the brake pedal 24a, the brake sensor 24 provides the control unit 2 with a signal indicating the amount of depression of the brake pedal 24a, and the control unit 2 controls the brake controller 31 to apply the brakes. At the same time, the control unit 2 controls the throttle actuator 30 to decrease the throttle valve opening according to the amount of depression of the brake pedal 24a.

In order for creep control to be performed, the mode selector 21 must be set for creep control, the vehicle speed must be below a prescribed speed (such as 15 km/hour), and the vehicle separation must be less than a prescribed maximum separation (such as 5 meters). When the driver sets the mode selector 21 for the creep control mode, the control unit 2 checks the input signals from the vehicle speed sensor 6 and the vehicle separation sensor 22 to determine if these conditions concerning the vehicle speed and vehicle separation are satisfied. If either the vehicle speed or the vehicle separation is above the prescribed limit, the creep control mode is not initiated. However, if they are both satisfied, then the indicator 32 indicates to the driver that the vehicle is in the creep control mode. The indicator 32 continues to indicate the present mode until the mode is cancelled, so the driver can always determine the present mode from the indicator 32.

When the control unit 2 initiates creep control, in a prescribed speed range (of up to 20 km/hour, for example), the control unit 2 calculates a target speed based on the amount of depression of the accelerator pedal 10a as indicated by the accelerator pedal depression sensor 10. Based on the input signals from the vehicle speed sensor 6, the engine rotational speed sensor 9, the throttle opening sensor 12, the vehicle separation sensor 22, and the obstacle sensor 23, the control unit sets the speed changer 13 to the optimal speed change ratio for the current driving conditions, and it performs feedback control of the throttle actuator 30 so as to maintain the vehicle speed at the target speed. In order to maintain the target speed on an uphill slope, the control unit 2 controls the throttle actuator 30 to increase the throttle valve opening to increase the engine output, while on a downhill slope, the control unit 2 controls the throttle actuator 30 to decrease the throttle valve opening and thereby decrease the engine output. In this manner, the vehicle speed can be maintained constant despite variations in the road conditions.

When the accelerator switch 11 detects that the driver has released the accelerator pedal 10a, the control unit 2 controls the brake control apparatus 31 to apply the brakes and stop the vehicle. As long as the accelerator pedal 10a is released, the brake controller 31 actuates the brakes to maintain the vehicle stationary. Therefore, even when the vehicle is on a slope, it is not necessary for the driver to step on the brake pedal 24a or to apply the parking brake when he wishes to stop the vehicle. When the driver wishes to again proceed forward, he need only depress the accelerator pedal 10a. Thus, in creep control mode, the driver can start and stop the vehicle by operating only the accelerator pedal 10a.

The control unit 2 cancels the creep control mode when the turn signal sensor 20 detects that the driver has turned on the turn signal, when the separation from the preceding vehicle exceeds a prescribed maximum separation, or when the driver operates the mode selector 21 to indicate his desire to cancel creep control. The indicator 32 then indicates to the driver that the creep control mode has been cancelled. Thus, in situations in which creep control is no longer appropriate, the vehicle automatically returns to normal driving mode even if the driver forgets to cancel the creep control mode. One situation in which the creep control mode is automatically cancelled is when the preceding vehicle changes lanes or suddenly accelerates.

The prescribed maximum separation from the preceding vehicle is determined by the speed of the preceding vehicle and by the speed of the present vehicle. The speed of the preceding vehicle is determined by the rate of change of the speed of the present vehicle and the rate of change of the vehicle separation. The relationship between the maximum vehicle separation and these parameters is previously stored in the form of a map in the control unit 2.

The control unit 2 is programmed to automatically stop the vehicle in the following instances. First, both during the normal driving mode and the creep control mode, the control unit 2 always monitors the brake sensor 24, and the brake controller 31 is made to operate whenever the driver steps on the brake pedal 24a, even if the accelerator pedal 10a is depressed at the same time, and precedence is given to braking the vehicle. Secondly, when the vehicle separation falls below a prescribed minimum separation or when the obstacle sensor 23 detects an obstacle within a prescribed distance in front of the vehicle, the control unit 2 automatically makes the brake controller 31 stop the vehicle, and the indicator 32 issues a warning to the driver. At this time, the creep control mode is not automatically cancelled, so if the obstacle moves out of the prescribed range or the vehicle separation increases above the minimum separation, the vehicle can continue to move forward under the creep control mode.

In this embodiment, in order to prevent dangerously rapid acceleration when the creep control mode is cancelled, the speed of opening of the throttle valve 3 is controlled in accordance with the speed of depression of the accelerator pedal 10a. A relationship between the speed of depression of the accelerator pedal 10a and the time for the throttle valve 3 to be opened by the amount to which it would be opened during the normal driving mode given the amount of depression of the accelerator pedal 10a is stored in the control unit 2 as a map. Upon cancellation of the creep control mode, the opening of the throttle valve 3 is controlled in accordance with this relationship. For example, if the accelerator pedal 10a is depressed at below a prescribed speed v, the throttle valve 3 is opened in a first prescribed length of time. When the accelerator pedal 10a is depressed faster than the prescribed speed v, the control unit 2 determines that the driver wishes to rapidly accelerate the vehicle, so the throttle valve 3 is immediately opened. In this manner, good responsiveness is maintained while dangerously rapid acceleration is prevented.

Figure 2:
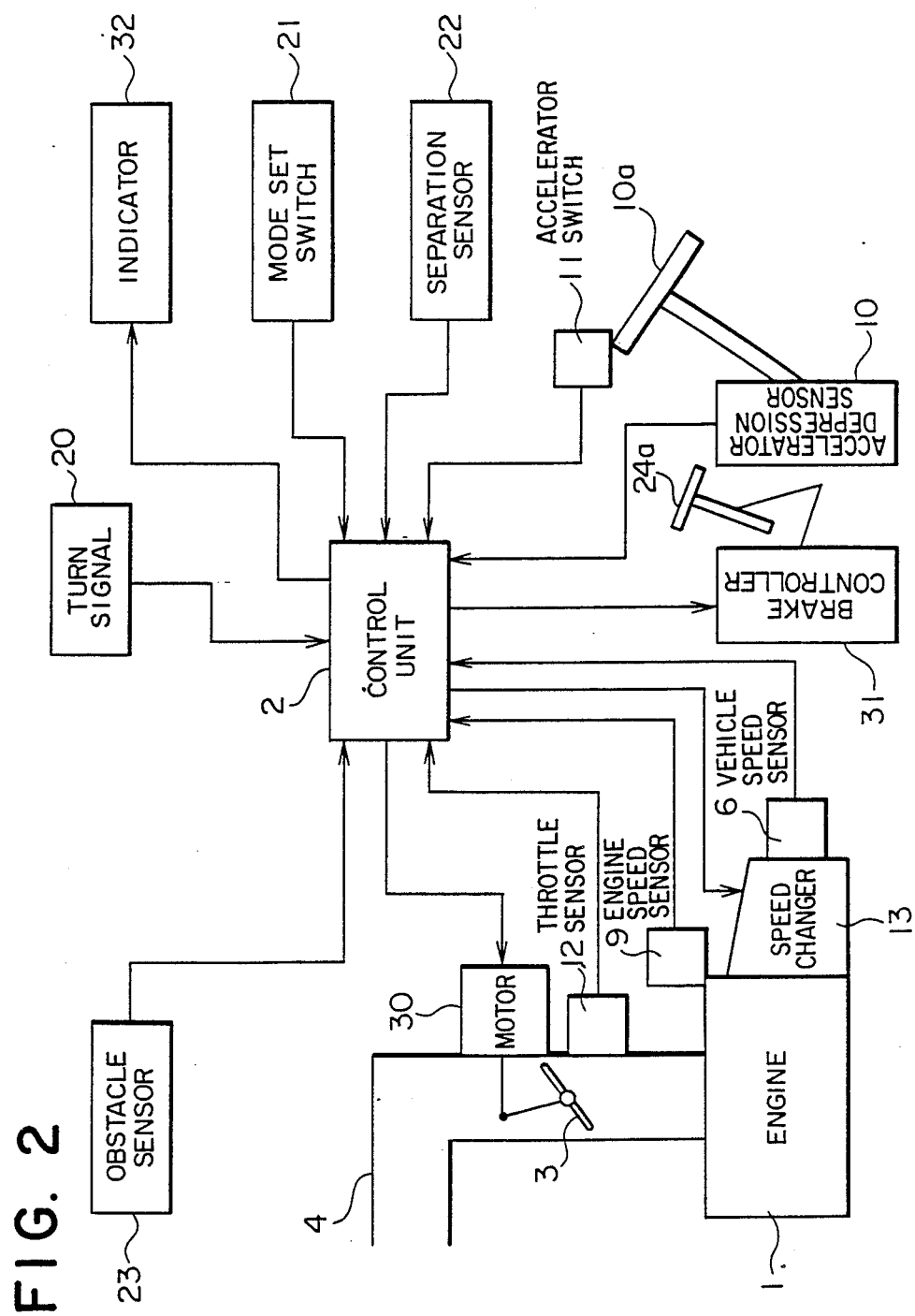
FIG. 2 is a block diagram of a second embodiment of a speed control apparatus.

FIG. 2 is a block diagram of a second embodiment of the present invention. This embodiment differs from the embodiment of FIG. 1 in that the brake controller 31 is also mechanically actuated directly by the brake pedal 24a rather than only being electronically actuated via a brake sensor 24 and the control unit 2. The structure and operation of this embodiment are otherwise the same as for the embodiment of FIG. 1.

Figure 3:
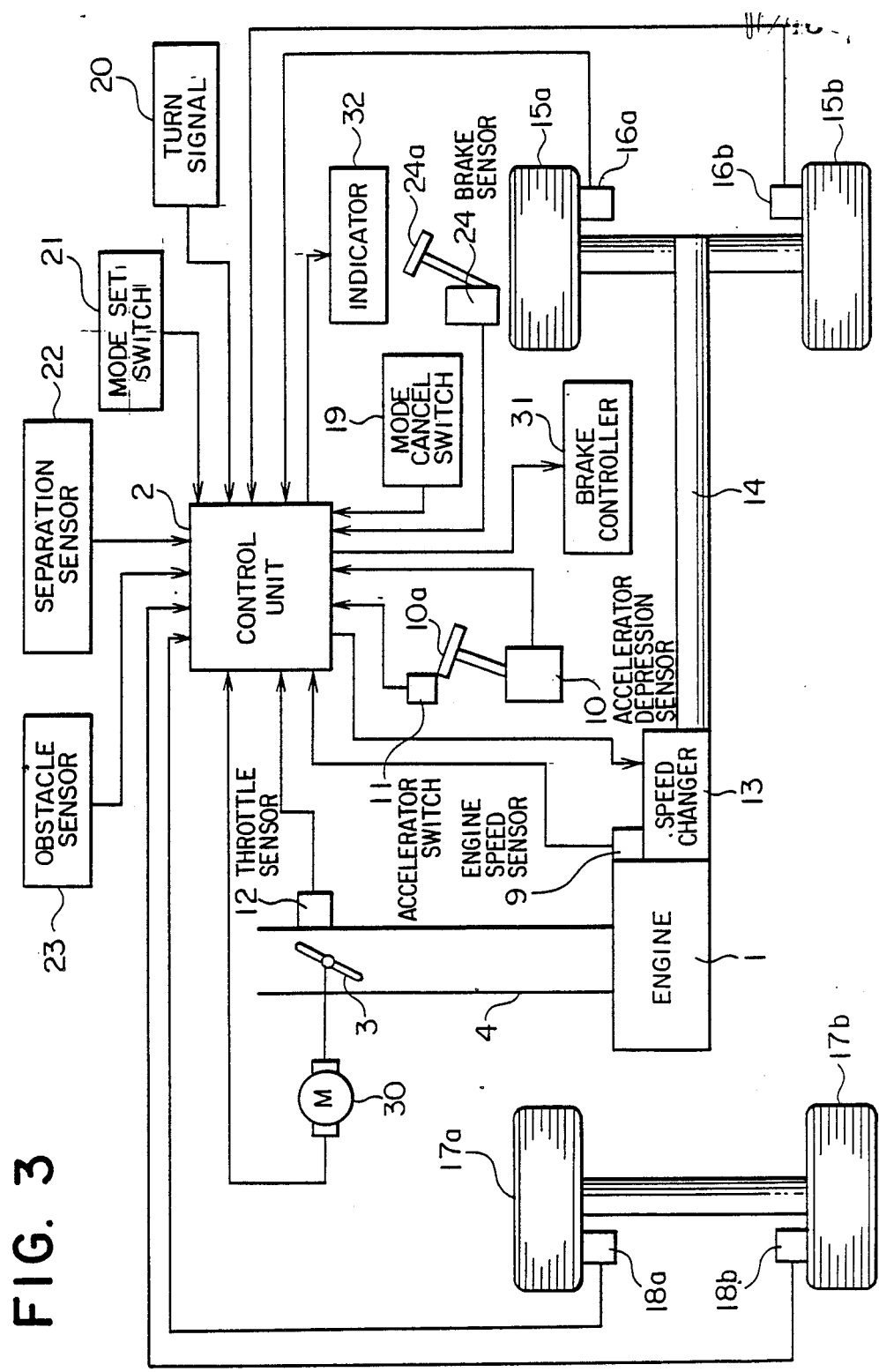
FIG. 3 is a block diagram of a third embodiment of a speed control apparatus.

The embodiments of FIGS. 1 and 2 have only two modes of operation: a creep control mode and a normal driving mode. FIG. 3 is a block diagram of a third embodiment of the present invention which in addition to the above-described modes has a slip suppression mode of operation in which it suppresses wheel slip. The basic structure of this embodiment is similar to that of the embodiment of FIG. 1, so only those elements of FIG. 3 which are not also illustrated in FIG. 1 will be described.

This embodiment is applied to a vehicle having rear-wheel drive, although it could be equally as well applied to a vehicle with front-wheel drive or 4-wheel drive. The rotation of the engine 1 is transmitted to the right and left rear wheels 15a and 15b of the vehicle by a drive shaft 14 which is connected to the speed changer 13. The right and left front wheels 17a and 17b are not driven. The rotational speeds of the right and left rear wheels 15a and 15b are detected by rotational speed sensors 16a and 16b, respectively, while the rotational speeds of the right and left front wheels 17a and 17b are detected by rotational speed sensors 18a and 18b, respectively. The speed sensors 16a, 16b, 18a, and 18b provide the control unit 2 with output signals indicating the detected rotational speeds. A mode cancel switch 19 which is manually operated by the driver provides the control unit 2 with a signal indicating whether the driver wishes wheel slip suppression to be performed. This switch 19 need not be of any particular type, but in the present embodiment, it is a switch which the driver turns on when he wishes for the control unit 2 not to perform wheel slip suppression, and which he leaves off when he wishes for wheel slip suppression to be performed.

When the mode cancel switch 19 is on, since the driver does not desire wheel slip suppression, the control unit 2 selects either the creep control mode or the normal driving mode by the same selection process employed in the first embodiment. The control of the vehicle in the creep control mode or the normal driving mode is performed in the same manner as in the first embodiment. When the mode cancel switch 19 is off, the driver desires for wheel slip suppression to be performed, so the control unit 2 determines the amount of wheel slip. If the amount of wheel slip is above a prescribed level, the control unit 2 changes the operating mode to the slip suppression mode.

The control unit 2 determines the amount of wheel slip based on the output signals of the wheel rotational speed sensors 16a, 16b, 18a, and 18b. It does so by calculating the difference between the average rotational speed of the left and right rear wheels and the average rotational speed of the left and right front wheels. The speed of the front wheels, which are not driven, is taken to be the vehicle speed. If the difference between the average speeds of the front and rear wheels is above a prescribed value, the control unit 2 determines that wheel slip is taking place and changes the operating mode to the slip suppression mode. When the control unit 2 changes to this mode, the indicator 32 alerts the driver of the change in the operating mode. For example, the indicator 32 can be made to sound a buzzer for a prescribed length of time when a mode change takes place. The indicator 32 then indicates that the vehicle is in the slip suppression mode until this mode is cancelled.

In the slip suppression mode, the control unit 2 controls the throttle actuator 30 to close the throttle valve 3 to a prescribed position and reduce the engine output. After reducing the throttle valve opening, if the control unit 2 still detects wheel slip, it then controls the brake controller 31 to apply the brakes. Thereafter, at prescribed time intervals, the control unit 2 opens the throttle valve 3 to its original position for as brief a period as possible and monitors the amount of wheel slip. The above-described series of operations is repeated until wheel slip is suppressed.

During the slip suppression mode, if the driver turns on the mode cancel switch 19, the control unit 2 automatically switches to either the normal driving mode or the creep control mode, depending on the setting of the mode set switch 21 and the current vehicle speed and vehicle separation. current vehicle speed and vehicle separation.

As is clear from the preceding description, a speed control apparatus according to the present invention enables a driver to operate a vehicle during creep control by manipulating only the accelerator pedal. The driver is relieved of the need to repeatedly step on the brake pedal and the accelerator pedal, as in a conventional vehicle, and he can maintain a constant vehicle speed simply by maintaining the depression of the accelerator pedal constant. Furthermore, the driver can readily adjust the creep speed by adjusting the accelerator pedal depression. In addition, the driver is relieved of the need to pay close attention to the separation from the preceding vehicle or obstacles, since the vehicle is automatically stopped when the separation from the preceding vehicle or an obstacle falls below a prescribed level. As a result, driving in congested traffic for long periods is much less fatiguing than in a conventional automobile. Wheel slip can also be automatically suppressed, so the directional stability of the vehicle can be maintained.

What is claimed is:

1. A slow, creep speed control apparatus for an automotive vehicle comprising:
    a throttle actuator for opening and closing a throttle valve of the vehicle;
    a brake actuator (31) for controlling the application of a brake of the vehicle;
    an accelerator pedal depression sensor for sensing the amount of depression of an accelerator pedal of the vehicle;
    a vehicle speed sensor for sensing the speed of the vehicle;
    a vehicle separation sensor for sensing the separation of the vehicle from a preceding vehicle; and
    a controller responsive to output signals from the accelerator pedal depression sensor, the vehicle speed sensor, and the vehicle separation sensor, the controller comprising:
    mode selecting means for selecting one of a plurality of different operating modes which include at least a normal driving mode and a slow, creep speed control mode; and
    creep control means for determining a slow, target creep speed for the vehicle based on the amount of depression of the accelerator pedal, for controlling the throttle actuator to maintain the vehicle speed equal to the target creep speed during the creep speed control mode, and for controlling the brake actuator to apply the brake when the vehicle separation from the preceding vehicle falls below a prescribed minimum separation or when the accelerator pedal is not depressed.

2. A speed control apparatus as claimed in claim 1, wherein the mode selecting means comprises means for selecting the creep speed control mode only when the vehicle speed is below a prescribed speed and the vehicle separation is below a prescribed maximum separation.

3. A speed control apparatus as claimed in claim 1, further comprising an obstacle sensor for sensing an obstacle, wherein the creep control means comprises means for controlling the brake actuator to apply the brake when an obstacle is detected by the obstacle sensor within a prescribed distance of the vehicle.

4. A speed control apparatus as claimed in claim 1, further comprising a brake pedal depression sensor for detecting the amount of depression of a brake pedal of the vehicle, wherein the creep control means includes means for controlling the throttle actuator to decrease the throttle valve opening in accordance with the amount of brake pedal depression sensed by the brake pedal depression sensor.

5. A speed control apparatus as claimed in claim 1, further comprising a mode selector for indicating to the mode selecting means of the controller the operating mode desired by the driver, the mode selecting means comprising means responsive to the mode selector for selecting an operating mode other than the creep speed control mode when the driver changes his desired operating mode during the creep speed control mode.

6. A speed control apparatus as claimed in claim 1, further comprising a turn signal sensor for sensing when a turn signal of the vehicle is on, the mode selecting means comprising means responsive to the turn signal sensor for switching from the creep speed control mode, to another operating mode when the turn signal is turned on.

7. A speed control apparatus as claimed in claim 1, further comprising slip sensing means for sensing the slipping of drive wheels of the vehicle, wherein:
    the plurality of operating modes which can be selected by the mode selecting means includes a slip suppression mode, the mode selecting means including means for selecting the slip suppression mode when the slip sensing means senses wheel slip; and
    the controller further comprises slip suppression means for controlling the throttle actuator to reduce the throttle valve opening when wheel slip is sensed.

8. A speed control apparatus as claimed in claim 7, further comprising slip suppression cancelling means for indicating to the mode selecting means a desire of the driver not to perform slip suppression, wherein the mode selecting means comprises means responsive to the slip suppression cancelling means for switching from the slip suppression mode to another operating mode when the driver desires not to perform slip suppression.

* * * * *